United States Patent [19]

Saitoh et al.

[11] Patent Number: 4,891,173

[45] Date of Patent: Jan. 2, 1990

[54] PROCESS FOR PRODUCING A CROSSLINKED AND ORIENTED POLYETHYLENE FILM

[75] Inventors: Keichiro Saitoh, Iruma; Yasushi Itaba, Higashi-Kurume; Minoru Izawa, Iruma; Tadao Yoshino, Minami-Saitama, all of Japan

[73] Assignee: Toa Nenryo Kogyo Kabushiki Kaisha, Tokyo, Japan

[21] Appl. No.: 241,573

[22] Filed: Sep. 8, 1988

[30] Foreign Application Priority Data

Sep. 9, 1987 [JP] Japan .................................. 62-223854

[51] Int. Cl.$^4$ .............................................. B29C 35/08
[52] U.S. Cl. ...................... 264/22; 264/210.2; 264/289.3; 264/290.2; 264/331.17; 264/347; 522/161; 525/240
[58] Field of Search ................... 264/210.2, 22, 331.17, 264/289.3, 289.6, 209.6, 236, 347, 290.2; 525/240; 522/161

[56] References Cited

U.S. PATENT DOCUMENTS

| | | |
|---|---|---|
| 3,563,870 | 2/1971 | Tung ...................................... 264/22 |
| 3,886,056 | 5/1975 | Kitamoru et al. ..................... 264/22 |
| 4,226,905 | 10/1980 | Harbourne ............................ 264/22 |
| 4,551,380 | 11/1985 | Schoenberg ...................... 264/209.6 |
| 4,590,020 | 5/1986 | Itaba et al. ............................ 264/22 |
| 4,636,340 | 1/1987 | Itaba et al. ............................ 264/22 |
| 4,705,714 | 11/1987 | Itaba et al. .......................... 428/215 |

FOREIGN PATENT DOCUMENTS

| | | | |
|---|---|---|---|
| 55-48029 | 12/1980 | Japan ................................. 264/289.3 |
| 57-199626 | 12/1982 | Japan .................................... 264/25 |
| 59-174321 | 10/1984 | Japan ................................. 264/210.2 |
| 59-174322 | 10/1984 | Japan ................................. 264/210.2 |

Primary Examiner—Jeffery Thurlow
Attorney, Agent, or Firm—Wenderoth, Lind & Ponack

[57] ABSTRACT

A crosslinked and oriented polyethylene film superior in clarity as well as moistureproofness and having an improved stretchability is produced by a process for producing a crosslinked and oriented polyethylene film such that the degree of crosslinking inwardly decreases across the thickness of the film, comprising using a polyethylene having a density of at least 0.935 g/cm$^3$, a melt index of 0.5 to 20 g/10 min and a high-load melt index to melt index ratio of 40 to 200.

11 Claims, No Drawings

PROCESS FOR PRODUCING A CROSSLINKED AND ORIENTED POLYETHYLENE FILM

BACKGROUND OF THE INVENTION

1. Field of the Invention

This invention relates to a process for producing a crosslinked and oriented polyethylene film and more particularly, it is concerned with a process for producing a crosslinked and oriented polyethylene film which is superior in clarity as well as moisture proofness and has an improved stretchability.

2. Description of the Prior Art

Polyethylene has hitherto been applied to a number of uses, but polyethylene films obtained from high density polyethylene have hardly been used in application areas where display effects are required mainly because they are generally poor in clarity. As a process for improving the clarity of polyethylene films, for example, it has been proposed to subject a polyethylene film to an irradiation treatment for uniformly crosslinking and biaxially orienting, as disclosed in Japanese Patent Publication No. 18893/1962.

This process is effective in improving the clarity and strength of the film, but not completely effective in improving the moistureproofness of the film. In order to impart improved moistureproofness, it is necessary to increase the film thickness or to provide the film with a resin layer as a barrier. This adversely affects the clarity and packaging property of the film and also results in an increased production cost.

The inventors have proposed a polyethylene film which is crosslinked and oriented in such a manner that the degree of crosslinking inwardly decreased across the thickness of the film, and a process for producing the same, thus obtaining a crosslinked and oriented polyethylene film excellent in clarity and moistureproofness, as disclosed in Japanese Patent Laid-Open Publication Nos. 174321/1984 and 174322/1984.

However, the thus obtained film has parts which are not crosslinked or crosslinked to a lower extent and consequently, tends to be affected by the structural properties of the original resin. Therefore, the above proposed process still leaves room for improvement in the production of the film, in particular, stretching operations such as controlling the stretching temperature, stock sheet thickness, film forming speed, etc.

SUMMARY OF THE INVENTION

It is an object of the present invention to provide a process for producing economically a crosslinked and oriented polyethylene film which is superior in clarity and moisture-proofness and has an improved stretchability.

It is another object of the present invention to provide a process for producing a crosslinked and oriented polyethylene film with improved stretching conditions.

It is a further object of the present invention to provide a crosslinked and oriented polyethylene film useful as various packaging materials.

These objects can be attained by a process for producing a crosslinked and oriented polyethylene film such that the degree of crosslinking inwardly decreases across the thickness of the film, comprising using a polyethylene having a density of at least 0.935 g/cm$^3$, a melt index of 0.5 to 20 g/10 min and a high-load melt index to melt index ratio of 40 to 200.

DETAILED DESCRIPTION OF THE INVENTION

The inventors have made various studies to overcome the disadvantages of the prior art and consequently, have found that the stretchability of a polyethylene film can be improved by using a high density polyethylene with a specified molecular weight distribution as a starting polyethylene. The present invention has been completed on the basis of this finding.

Accordingly, the present invention provides a process for the production of a crosslinked and oriented polyethylene film such that the degree of crosslinking inwardly decreases across the thickness of the film, characterized in that said film is produced from a polyethylene having a density of 0.935 g/cm$^3$ or more, a melt index (hereinafter referred to as "MI") of 0.5 to 20 g/10 min and a high-load melt index to melt index ratio (hereinafter referred to as "HLMI/MI") of 40 to 200.

The polyethylene used in the present invention is crystalline ethylene homopolymer or ethylene-α-olefin copolymer produced by the medium- or low-pressure process. It should have a density of 0.935 g/cm$^3$ or more, preferably 0.950 g/cm$^3$ or more. With a density of less than 0.935 g/cm$^3$, the polyethylene does not provide a film having improved moistureproofness. In addition, the polyethylene should have an MI of 0.5 to 20 g/10 min, preferably 0.5 to 5 g/10 min. With an MI of less than 0.5 g/10 min, the polyethylene is poor in film-forming property. Conversely, with an MI of more than 20 g/10 min, the polyethylene does not provide a film which is uniformly stretched. The polyethylene should have an HLMI/MI value in the range of 40 to 200, preferably 45 to 100. With an HLMI/MI value of smaller than 40, the polyethylene has a narrow optimum stretching temperature range. Conversely, with an HLMI/MI value greater than 200, the polyethylene provides a film which is poor in clarity and tends to stick to the rolls during the film-forming process. For the prevention of sticking, the polyethylene should preferably have a molecular weight (measured by GPC method) of lower than 1000 and contains less than 5 wt% of a low molecular weight component.

The polyethylene having the above described physical properties can be obtained, for example, by carrying out the polymerization of ethylene in two stages to control MI and thereby forming a polyethylene consisting of a high molecular weight component and low molecular weight component, or by blending a high molecular weight polyethylene and low molecular weight polyethylene each of which is produced by one-stage polymerization. The high molecular weight polyethylene generally has a density of 0.93 g/cm$^3$ or more and an MI of 0.01 to 1 g/10 min and the low molecular weight polyethylene generally has a density of 0.95 g/cm$^3$ or more and an MI of 5 to 1000 g/10 min, which can optionally be chosen from those obtained by polymerizing or blending.

Incidentally, these high density polyethylene can be mixed with low density polyethylenes or linear low density polyethylenes in an amount of less than 10 wt %.

Furthermore, these can be mixed with commonly usd antioxidants, UV absorbers, slip agents, antiblocking agents, antistatic agents, pigments dyes, etc.

In the production of the polyethylene film according to the present invention, a high density polyethylene is fed to a commonly used extruder and formed into a flat or tubular stock sheet by melt extrusion, followed by cooling and solifying. The stock sheet may be obtained in the form of a flat sheet by extrusion from a conventional T-die or in the form of a tubular sheet by extrusion from an annular die. The flat stock sheet can also be obtained from a tubular stock sheet by cutting one or both edges of the lay-flat tube. In these cases, the thickness of the stock sheet should be such that the sheet can be crosslinked so that the degree of crosslinking decreases across its thickness from both surface toward the middle. It is generally determined according to the draw ratio and the film thickness after stretching. It is usually 210 to 2000 $\mu$m, preferably 400 to 1000 $\mu$m. The thickness in this range is adequate to handle the stock sheet with ease and to accomplish the crosslinking as described above.

According to the present invention, the flat or tubular stock sheet of polyethylene resin should be crosslinked in such a manner that the degree of crosslinking decrease inwardly from each surface of the sheet reaching a minimum near the middle of the sheet. The degree of crosslinking is expressed in terms of gel fraction. The object of the present invention is achieved when the degree of crosslinking in the stock sheet is such that the gel fraction is 0 to 5% in the middle layer portion where the degree of crosslinking is lowest and the gel fraction is 5% or more, preferably 20 to 70% in the opposite surface layer portions where the degree of crosslinking is highest. In the case where the middle layer portion has a gel fraction of 0% in which the degree of crosslinking is lowest and there are formed crosslinked layer/uncrosslinked layer/crosslinked layer in the thickness direction of the stock sheet, the thickness of each outer layer portion should preferably be 0.1 to 10 times that of the middle layer portion. More preferably, both the outer layer portions have a same degree of crosslinking.

If crosslinking is performed in such a manner that the gel fraction in the middle layer portion, in which the degree of crosslinking should be lowest, is higher than 5%, the stock sheet can be stretched uniformly and improved in clarity, but the film having improved moistureproofness, which is the principal object of the present invention, is not obtained. On the other hand, if crosslinking is performed in such a manner that the gel fraction in the outer layers is lower than 20%, the stock sheet cannot be stretched uniformly and the resulting film is not improved in clarity and moistureproofness. If crosslinking is performed in such a manner that the gel fraction in the outer layer exceeds 70%, the stock sheet tends to break during stretching and cannot be stretched smoothly. If crosslinking is performed in such a manner that the stock sheet is crosslinked uniformly across the thickness, the stock sheet can be stretched uniformly with improved clarity, but the moistureproofness is not improved. The preferred maximum crosslinking produces gel fraction in the outer layer between about 40 to 70%. If crosslinking is performed in such a manner that only one of the outer layers of the stock sheet is crosslinked, the stock sheet tends to break during stretching. If crosslinking is performed in such a manner that the degree of cross linking decreases unidirectionally across the thickness from one surface to the other, the resulting film is not satisfactorily improved in clarity and moistureproofness.

The above described gel fraction is the quantity in percent of the fraction that remains undissolved when a specimen is extracted with boiling p-xylene.

The above described crosslinking can be carried out by irradiating both the surfaces of a stock sheet with electron ray or by multilayer coextrusion in which the polyethylene for individual layers contains a different amount of crosslinking agent.

The dosage of irradiation with electron rays varies depending on the thickness of the stock sheet and the type, molecular weight and molecular weight distribution of polyethylene resin, but it is usually 5 to 50 Mrad and preferably 15 to 30 Mrad. Both sides of the stock sheet may be irradiated at one time or one after the other, or repeatedly several times. More preferably, both sides should be irradiated with the same dosage. The penetrating power of electron rays should properly be adjusted according to the thickness of the stock sheet by changing the applied voltage or by using a shield.

The dosage of electron rays can be adjusted in the following manner: When a stock sheet which is 500 $\mu$m thick is to be irradiated, for example, a sample is prepared by tightly laying 25 pieces of 20 $\mu$m thick film on top of another, irradiating the sample from both sides thereof with the same dosage of electron rays, taking apart the crosslinked sample in the 25 pieces of 20 $\mu$m thick and measuring the degree of crosslinking in the individual films. The result of measurement tells the degree of crosslinking which varies across the thickness of the sample. The thus obtained data reveals the relationship between the thickness of the stock sheet and the degree of crosslinking or the dosage of irradiation.

The irradiation with electron rays should preferably be carried out in an atmosphere of nitrogen, argon, helium or other inert gas. Irradiation with electron rays in the air is possible, but this results in films which are not satisfactorily improved in clarity.

The crosslinking by multilayer coextrusion is accomplished in such a manner that a polyethylene resin of high density containing a crosslinking agent such as organic peroxides is fed to an extruder which forms both outer layers in the case of a flat stock sheet or the inner and outer layers in the case of a tubular stock sheet, and another high density polyethylene containing no organic peroxide or containing an organic peroxide just enough to achieve the minimum degree of crosslinking is fed to the extruder which forms the intermediate layer, and the polyethylene resins are coextruded and crosslinked at a temperature of higher than their melting points.

The crosslinked stock sheet is then stretched uniaxially or biaxially at a predetermined draw ratio by the conventional rolling, tentering or tubular method. Biaxial orientation may be accomplished by either simultaneous stretching or sequential stretching.

The stretching temperature should preferably be lower than the melting point of polyethylene resin and more preferably at a temperature or ranging from the softening point to the melting point of polyethylene resin. Specifically, it is 70° to 135° C. and preferably 100° to 130° C. Uniform and stable stretching is impossible at a temperature lower than the softening point because of insufficient softening of the resin and stretching at a temperature higher than the melting point results in an oriented film with insufficient moistureproofness although uniform stretching is possible.

The draw ratio should preferably be greater than 3 times, more preferably greater than 4 times in one direction or in both longitudinal and lateral directions. When the draw ratio is lower than 3 times, uniform stretching is impossible and the resulting film is not sufficiently improved in moistureproofness and clarity.

The oriented film thus obtained has heat-shrinkable properties. If the oriented film is to be used as a substrate of a composite film for packaging, therefore, it should preferably be subjected to heat setting at a temperature of, for example, 110° to 140° C., lower than the melting point of the oriented film so that the heat shrinkage ratio in the lateral direction is reduced to 1.5% or less, more preferably 1.0% or less.

As illustrated in detail above, the present invention provides a process for the production of a crosslinked and oriented polyethylene film with such a crosslinking structure that the degree of crosslinking is specified in the thickness direction of the film using a polyethylene having the specific characteristic properties. According to the process to the present invention, therefore, a crosslinked and oriented polyethylene film superior in clarity and moistureproofness can be produced by stretching at a temperature of lower than in the prior art, the optimum temperature range of stretching is enlarged and stretching can thus be performed more readily without possibility of film sticking to rolls. Moreover, the use of the polyethylene having the specific characteristic properties results in excellent moldability or processing, easy control of the stock sheet thickness during stretching and possibility of high speed stretching. Thus, the process of the present invention is suitable for the economical production of a crosslinked and oriented polyethylene film useful as various packaging materials.

The following examples are given in order to illustrate the present invention in detail without limiting the same, in which percents and parts are to be taken as those by weight unless otherwise indicated. Test methods employed herein to evaluate the film performances are given below:
(1) Water vapor permeability: JIS Z0208, Method-B
(2) Haze: JIS K6714
(3) Gel fraction: ASTM D2765, Method-A
(4) Component of low molecular weight (lower than $10^3$): GPC method

EXAMPLE 1

High-density polyethylene (density: 0.957 g/cc, MI: 1.0 g/10 min, HLMI/MI 45.6, melting point: 134° C., polymerized in two stages) was formed into a 750 μm thick stock sheet using a T-die extruder. Both sides of the stock sheet were irradiated with electron rays at a dosage of 20 Mrad (175 KV, 8mA) in a nitrogen atompshere using an electron ray irradiator (made by ESI Co., Ltd.).

The gradient of the degree of crosslinking across the thickness of the stock sheet was estimated in the following manner. 25 pieces of 30 μm thick films were laid on top of another to make a 750 μm thick test specimen. The specimen was irradiated under the same conditions as described above. After irradiation, the specimen was taken apart and the degree of crosslinking of the individual films was examined to find that the maximum fel fraction was 50% in the outer layers and the minimum gel fraction was 0% in the inner layer. The irradiated stock sheet was found to be composed of a crosslinked outer layer/uncrosslinked inner layer/crosslinked outer layer, the ratio of their thickness being 1:1.75:1.

The crosslinked stock sheet was heated at 127° C. and then stretched 4 times (400% by length) in the longitudinal direction and 6 times (600% by length) in the lateral direction sequentially by using a tenter-type biaxial stretching machine, thus obtaining a 30 μm thick oriented film having the properties as shown in Table 1.

EXAMPLES 2 TO 9 AND COMPARATIVE EXAMPLES 1 TO 3

From polyethylene resins varying in density, MI, HLMI/MI and production process (2-stage polymerization, blending or 1-stage polymerization), various oriented films were produced in an analogous manner to Example 1, except changing the thickness of the stock sheet, the degree of crosslinking across the thickness of the stock sheet and the stretching conditions as shown in Table 1. The properties of these films are shown in Table 1, in which the presence or absence of film sticking to rolls is indicated by "yes" or "no", respectively.

TABLE 1

| Example | Polyethylene Density (g/cm³) | MI (g/10 min) | HLMI/MI | Production process | Component of low molecular weight(%) | Thickness of stock sheet film(μm) | Ratio of CL:UL:CL* | Gel fraction in irradiated surface(%) | Gel fraction in minimum (%) | Gel fraction in irradiated surface(%) | Temperature (°C) | Draw ratio (L × T) | Sticking of film to roll | Thickness (μm) | Haze (%) | Moisture permeability (g/m²/24 hrs) |
|---|---|---|---|---|---|---|---|---|---|---|---|---|---|---|---|---|
| 1 | 0.957 | 1.0 | 45.6 | 2-stage | 1.3 | 750 | 1:1.75:1 | 50 | 0 | 50 | 127 | 4 × 6 | no | 30 | 2.4 | 2.2 |
| 2 | 0.959 | 0.6 | 66.0 | 2-stage | 1.5 | 750 | 1:1.75:1 | 50 | 0 | 50 | 125 | 4 × 6 | no | 30 | 2.7 | 2.0 |
| 3 | 0.960 | 1.2 | 63.1 | blend | 2.4 | 750 | 1:1.75:1 | 47 | 0 | 47 | 125 | 4 × 6 | no | 30 | 3.0 | 2.1 |
| 4 | 0.956 | 0.7 | 66.0 | blend | 1.5 | 750 | 1:1.75:1 | 50 | 0 | 50 | 125 | 4 × 6 | no | 30 | 2.7 | 2.1 |
| 5 | 0.959 | 0.8 | 140.0 | blend | 3.5 | 750 | 1:1.75:1 | 46 | 0 | 46 | 123 | 4 × 6 | no | 30 | 2.9 | 1.8 |
| 6 | 0.960 | 1.2 | 138.9 | blend | 4.6 | 750 | 1:1.75:1 | 45 | 0 | 45 | 123 | 4 × 6 | no | 30 | 3.1 | 2.0 |
| 7 | 0.960 | 4.5 | 55.0 | 2-stage | 3.0 | 750 | 1:1.75:1 | 45 | 0 | 45 | 127 | 4 × 6 | no | 30 | 4.0 | 2.3 |
| 8 | 0.959 | 1.0 | 66.0 | 2-stage | 1.5 | 500 | 1:0.5:1 | 50 | 0 | 50 | 127 | 4 × 6 | no | 20 | 2.0 | 3.3 |
| 9 | 0.960 | 15 | 42.0 | 1-stage | 4.2 | 750 | 1:0.75:1 | 50 | 0 | 50 | 125 | 4 × 6 | no | 30 | 4.8 | 2.5 |
| (1)** | 0.957 | 0.8 | 26.4 | 2-stage | 0.6 | 750 | 1:1.75:1 | 50 | 0 | 50 | 127 | 4 × 6*** | — | — | — | — |
| (2)** | 0.957 | 0.5 | 260.0 | 2-stage | 8.5 | 750 | 1:1.75:1 | 42 | 0 | 42 | 121 | 4 × 6 | yes | 30 | 9.4 | 2.4 |
| (3)** | 0.960 | 1.2 | 232.0 | blend | 10.0 | 750 | 1:1.75:1 | 45 | 0 | 45 | 125 | 4 × 6 | yes | 30 | 7.5 | 1.5 |
| (4)** | 0.956 | 0.6 | 38.0 | 2-stage | 0.9 | 750 | 1:1.75:1 | 50 | 0 | 50 | 127 | 4 × 6*** | — | — | — | — |
| (5)** | 0.958 | 1.1 | 210.0 | 2-stage | 7.0 | 750 | 1:1.75:1 | 47 | 0 | 47 | 126 | 4 × 6 | yes | 30 | 5.0 | 3.0 |

*CL - crosslinked layer, UL = uncrosslinked layer
**Comparative Examples
***Film was broken during stretching

What is claimed is:

1. A process for producing a crosslinked and oriented polyethylene film such that the degree of crosslinking inwardly decreases across the thickness of the film to form outer layer portions of the film each having gel fractions of between 20 to 70% and a middle layer portion of the film having a gel fraction between 0 to 5%, comprising using a polyethylene having a density of at least 0.935 g/cm$^3$, a melt of 0.5 to 20 g/10 min and a high-load melt index to melt index ratio of 40 to 200.

2. A process as claimed in claim 1, wherein the polyethylene is crystalline ethylene homopolymer or ethylene-α-olefin copolymer produced by the medium- or low-pressure process.

3. The process as claimed in claim 1, wherein the polyethylene is produced by polymerizing ethylene in two stages to control the melt index and thereby forming a polyethylene consisting of a high molecular weight component and low molecular weight component.

4. The process as claimed in claim 3, wherein the high molecular weight component has a density of at least 0.93 g/cm$^3$ and a melt index of 0.01 to 1 g/10 min, and the low molecular weight component has a density of at least 0195 g/cm$^3$ and a melt index of 5 to 1000 g/10 min.

5. The process as claimed in claim 1, wherein the polyethylene is obtained by blending a high molecular weight polyethylene and a low molecular weight polyethylene.

6. The process as claimed in claim 5, wherein the high molecular weight polyethylene has a density of at least 0.93 g/cm$^3$ and a melt index of 0.01 to 1 g/10 min, and the low molecular weight polyethylene has a density of at least 0.95 g/cm$^3$ and a melt index of 5 to 1000 g/10 min.

7. The process as claimed in claim 1, wherein the polyethylene is further mixed with at least one member selected from the group consisting of low density polyethylenes and linear low density polyethylene in a proportion of at most 10% by weight.

8. A process for producing a crosslinked and oriented polyethylene film, which comprises melting and extruding a high density polyethylene having a density of at least 0.935 g/cm$^3$, a melt index of 0.5 to 20 g/10 min and a high-load melt index tomelt index ratio of 40 to 200, followed by cooling and solidifying to form a stock sheet with a thickness of 210 to 2000 μm, crosslinking the opposite surfaces of the stock sheet in such a manner that the degree of crosslinking decreases from said surfaces inwardly to produce a sheet wherein the opposite outer layer portions of the sheet each have gel fractions of 20 to 70% and the middle layer portion of the sheet has gel fractions of 0 to 5%, and then heating and stretching the crosslinked sheet under conditions to orient the polyethylene molecules.

9. The process as claimed in claim 8, wherein the outer layer portions are crosslinked and the middle layer portion is an uncrosslinked film, the thickness ratio of the outer layer portion/middle layer portion/outer layer portion thereof ranging from 1:0.1:1 to 1:10:1.

10. The process as claimed in claim 8, wherein the crosslinking is carried out by irradiating both surfaces of the sheet.

11. The process as claimed in claim 8, wherein the stretching is carried out at least in one direction with a draw ratio of at least 300%.

* * * * *